US012706041B2

(12) United States Patent
Shin et al.

(10) Patent No.: US 12,706,041 B2
(45) Date of Patent: Aug. 11, 2026

(54) DISPLAY APPARATUS

(71) Applicant: Samsung Display Co., LTD., Yongin-si (KR)

(72) Inventors: Seung-Woon Shin, Yongin-si (KR); Kyoungsoo Kim, Yongin-si (KR); Jongdeuk Moon, Yongin-si (KR); Woon-Rok Jang, Yongin-si (KR); Tae-Seok Ha, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/968,789

(22) Filed: Dec. 4, 2024

(65) Prior Publication Data

US 2025/0273144 A1 Aug. 28, 2025

(30) Foreign Application Priority Data

Feb. 27, 2024 (KR) ........................ 10-2024-0027823

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2310/0286* (2013.01); *G09G 2320/0233* (2013.01); *G09G 2360/16* (2013.01)

(58) Field of Classification Search
CPC ......... G09G 3/3233; G09G 2300/0819; G09G 2300/0842; G09G 2310/0286; G09G 2320/0233; G09G 2360/16
USPC .................................................... 345/204, 76
See application file for complete search history.

(56) References Cited

U.S. PATENT DOCUMENTS

| | | | | |
|---|---|---|---|---|
| 10,984,718 | B2 * | 4/2021 | Baik | G09G 3/3258 |
| 11,107,411 | B1 * | 8/2021 | Zhang | G09G 3/3258 |
| 11,823,624 | B2 * | 11/2023 | Park | G09G 3/3233 |
| 2022/0215798 | A1 * | 7/2022 | Pyun | G09G 3/2096 |

FOREIGN PATENT DOCUMENTS

| | | | |
|---|---|---|---|
| KR | 10-1152466 | B1 | 6/2012 |
| KR | 10-2022-0085927 | A | 6/2022 |
| KR | 10-2022-0099168 | A | 7/2022 |
| KR | 10-2023-0051390 | A | 4/2023 |

* cited by examiner

*Primary Examiner* — Jimmy H Nguyen
(74) *Attorney, Agent, or Firm* — Womble Bond Dickinson (US) LLP

(57) ABSTRACT

A display apparatus includes: a display panel including a pixel; and a display panel driver providing an active data voltage to the pixel through a data line in an active period, and applying a blank data voltage to the data line in a blank period, the pixel including: a light emitting element; a first transistor applying a driving current to the light emitting element; a second transistor applying the active data voltage to the first transistor based on a first gate signal; and a third transistor applying an initialization voltage to the light emitting element based on a second gate signal, wherein the first gate signal transitions between a first high voltage and a first low voltage and the second gate signal transitions between a second high voltage and a second low voltage, and wherein the first low voltage is changed based on a driving frequency of the display panel.

19 Claims, 10 Drawing Sheets

BDLUT

| GRAY | BVDATA |
|---|---|
| GR1 | BVDATA1 |
| ... | ... |
| GR2 | BVDATA2 |
| ... | ... |
| GR3 | BVDATA3 |

DISPLAY APPARATUS

CROSS-REFERENCE TO RELATED APPLICATION

The present application claims priority to and the benefit of Korean Patent Application No. 10-2024-0027823, filed on Feb. 27, 2024, in the Korean Intellectual Property Office, the entire disclosure of which is incorporated herein by reference.

BACKGROUND

1. Field

Aspects of some embodiments of the present disclosure relate to a display apparatus.

2. Description of the Related Art

Generally, a display apparatus includes a display panel and a display panel driver. The display panel includes a plurality of gate lines, a plurality of data lines and a plurality of pixels. The display panel driver includes a gate driver providing a gate signal to the gate lines, a data driver providing a data voltage to the data lines and a driving controller controlling the gate driver and the data driver.

Generally, a display apparatus may perform a variable frequency driving in which a driving frequency of display panel is changed.

The above information disclosed in this Background section is only for enhancement of understanding of the background and therefore the information discussed in this Background section does not necessarily constitute prior art.

SUMMARY

Aspects of some embodiments of the present disclosure relate to a display apparatus. For example, aspects of some embodiments of the present disclosure relate to a display apparatus that may be capable of performing variable frequency driving.

Aspects of some embodiments include a display apparatus that may be capable of reducing a luminance difference in a variable frequency driving operation.

According to some embodiments, a display apparatus may comprise a display panel including a pixel and a display panel driver configured to provide an active data voltage to the pixel through a data line in an active period, and apply a blank data voltage to the data line in a blank period. According to some embodiments, the pixel may include a light emitting element, a first transistor configured to apply a driving current to the light emitting element, a second transistor configured to apply the active data voltage to the first transistor in response to a first gate signal and a third transistor configured to apply an initialization voltage to the light emitting element in response to a second gate signal. According to some embodiments, the first gate signal may transition between a first high voltage and a first low voltage and the second gate signal may transition between a second high voltage and a second low voltage. According to some embodiments, the first low voltage may be changed based on a driving frequency of the display panel.

According to some embodiments, when the driving frequency is changed from a first driving frequency to a second driving frequency lower than the first driving frequency, the first low voltage may be increased from a first voltage to a second voltage.

According to some embodiments, the first low voltage may be higher than the second low voltage during the second driving frequency.

According to some embodiments, in the blank period of a frame period corresponding to the second driving frequency, a blank current may flow through the second transistor.

According to some embodiments, in the blank period of a frame period corresponding to the second driving frequency, the first low voltage may be increased from the first voltage to the second voltage.

According to some embodiments, in the blank period of a frame period corresponding to the second driving frequency, the first low voltage may be gradually increased from the first voltage to the second voltage.

According to some embodiments, in the blank period of a frame period corresponding to the second driving frequency, the first low voltage may be increased stepwise from the first voltage to the second voltage.

According to some embodiments, the display panel driver may control a drain-source voltage of the second transistor in the blank period.

According to some embodiments, the display panel driver may include blank data look-up table in which stores voltage levels of the blank data voltage corresponding to a plurality of grayscales. The blank data voltage may be determined based on the blank data look-up table.

According to some embodiments, in the active period, the first low voltage may be the first voltage.

According to some embodiments, the display panel driver may include a voltage generator configured to generate the first low voltage and the second low voltage, a gate driver configured to generate the first gate signal based on the first low voltage and the first high voltage, and generate the second gate signal based on the second low voltage and the second high voltage, a data driver configured to apply the active data voltage and the blank data voltage and a driving controller configured to control the data driver, the gate driver and the voltage generator. According to some embodiments, the voltage generator may change the first low voltage based on the driving frequency.

According to some embodiments, when the driving frequency is changed from a first driving frequency to a second driving frequency lower than the first driving frequency, the voltage generator may increase the first low voltage.

According to some embodiments, in the blank period of a frame period corresponding to the second driving frequency, the voltage generator may change the first low voltage from a first voltage to a second voltage.

According to some embodiments, the gate driver may include a plurality of stages. According to some embodiments, at least one of the stages may include a first gate signal outputting circuit which outputs the first gate signal and a second gate signal outputting circuit which outputs the second gate signal. According to some embodiments, the first gate signal outputting circuit may be connected to a first low voltage line which receives the first low voltage, and the second gate signal outputting circuit may be connected to a second low voltage line which receives the second low voltage.

According to some embodiments, a length of the blank period may be changed based on the driving frequency.

According to some embodiments, when the driving frequency is changed from a first driving frequency to a second driving frequency lower than the first driving frequency, the length of the blank period may be increased.

According to some embodiments, when the length of the blank period is increased, the first low voltage may be increased.

According to some embodiments, the first transistor may include a control electrode connected to a first node, a first electrode receiving a first power voltage and a second electrode connected to a second node. According to some embodiments, the second transistor may include a control electrode receiving the first gate signal, a first electrode connected to the data line and a second electrode connected to the first node. According to some embodiments, the third transistor may include a control electrode receiving the second gate signal, a first electrode receiving the initialization voltage and a second electrode connected to the second node.

According to some embodiments, a display apparatus may comprise a display panel including a pixel, a gate driver configured to apply a first gate signal and a second gate signal to the display panel and a data driver configured to apply an active data voltage to the display panel. According to some embodiments, the first gate signal may transition between a first high voltage and a first low voltage and the second gate signal may transition between a second high voltage and a second low voltage. According to some embodiments, the first low voltage may be changed in a blank period in which an application of the active data voltage is stopped.

According to some embodiments, when a driving frequency of the display panel is changed from a first driving frequency to a second driving frequency lower than the first driving frequency, the first low voltage during the second driving frequency may be higher than the first low voltage during the first driving frequency.

As described above, in a display apparatus according to some embodiments, when a driving frequency is decreased, a blank current may flow during a blank period. Accordingly, a luminance of the display panel may be relatively reduced. Accordingly, the luminance difference between the display panel of a previous driving frequency and the display panel of a present driving frequency may be relatively reduced. Accordingly, a display quality of the display apparatus may be relatively improved.

Additionally, the active data voltage of the display apparatus may not be changed for compensating the luminance difference, the reverse compensation may not occur. Accordingly, a display quality of the display apparatus may be relatively improved.

BRIEF DESCRIPTION OF THE DRAWINGS

Illustrative, non-limiting embodiments will be more clearly understood from the following detailed description in conjunction with the accompanying drawings.

DETAILED DESCRIPTION

Hereinafter, aspects of some embodiments of the present disclosure will be explained in more detail with reference to the accompanying drawings.

Figure 1:
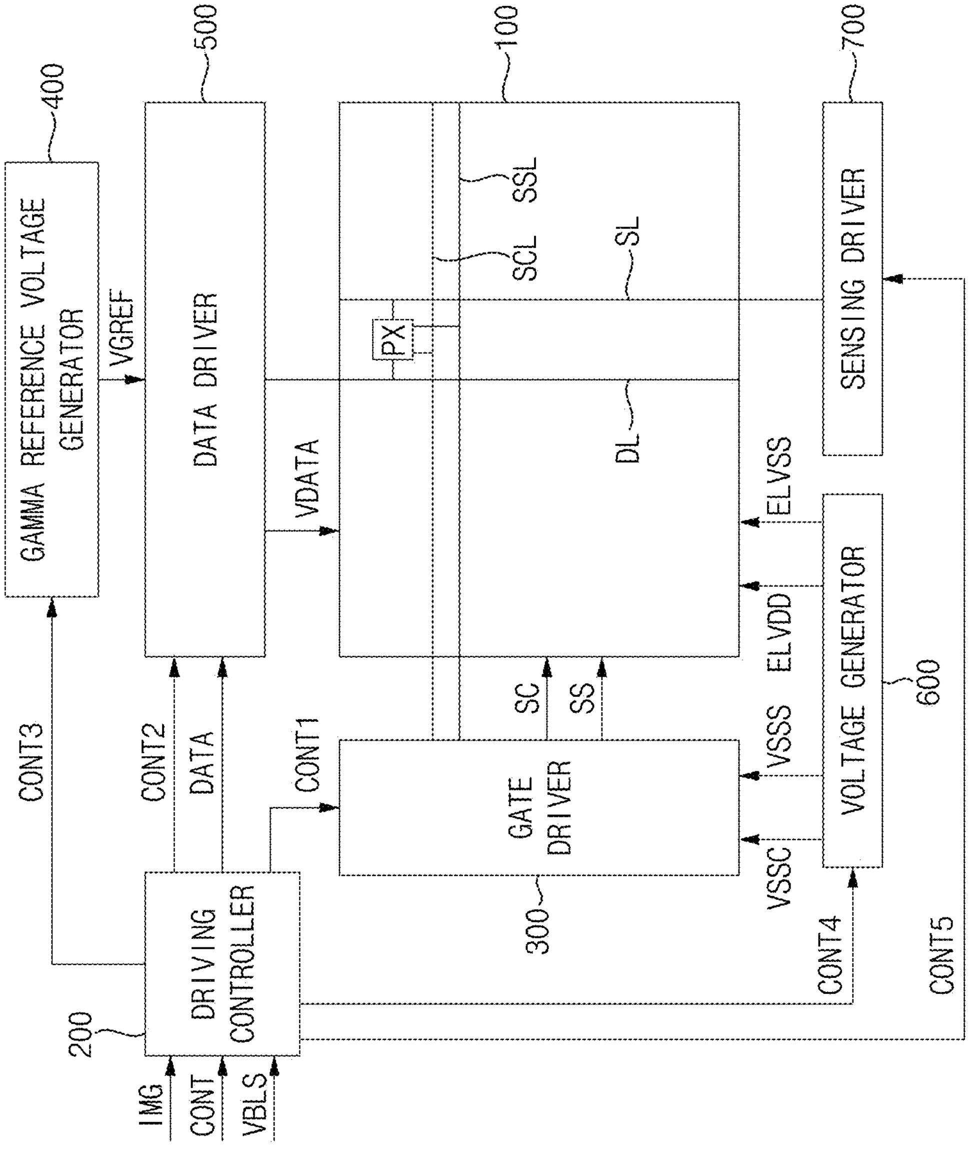
FIG. 1 is a block diagram illustrating a display device according to some embodiments of the present disclosure.

FIG. 1 is a block diagram illustrating a display device according to some embodiments of the present disclosure.

Referring to FIG. 1, the display apparatus includes a display panel 100 and a display panel driver. The display panel driver may include a driving controller 200, a gate driver 300, a gamma reference voltage generator 400, a data driver 500 and a voltage generator 600. According to some embodiments, the display panel driver 10 may further include the sensing driver 700.

Figure 2:
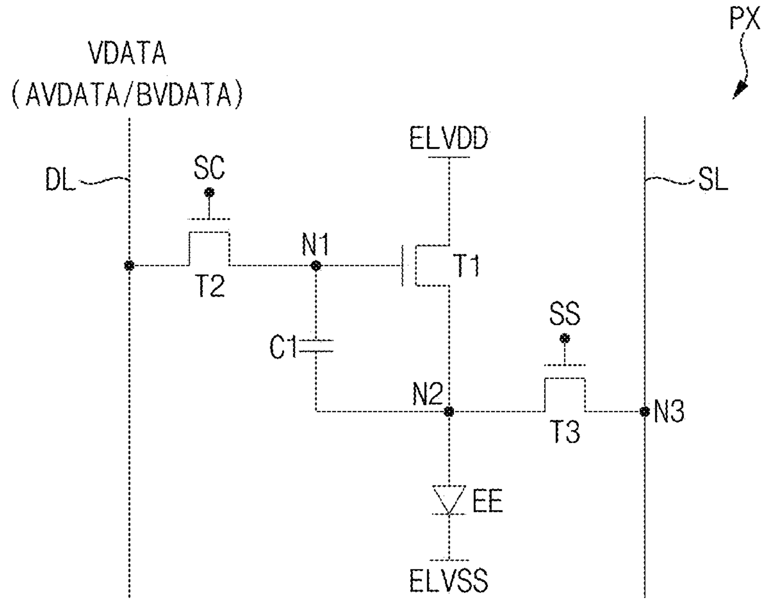
FIG. 2 is a circuit diagram illustrating an example of a pixel included in a display apparatus of FIG. 1.

According to some embodiments, the display panel driver may apply an active data voltage AVDATA of FIG. 2 to a pixel PX in an active period and not apply the active data voltage AVDATA of FIG. 2 to the pixel PX in a blank period. According to some embodiments, the display panel driver may apply a blank data voltage BVDATA of FIG. 2 to a data line DL in the blank period.

The display panel 100 may have a display region on which images are displayed and a peripheral region adjacent to (e.g., in a periphery or outside a footprint of) the display region.

The display panel 100 may include a plurality of gate lines, a plurality of data lines DL and a plurality of pixels PX connected to the gate lines and the data lines DL. According to some embodiments, the display panel 100 may further include a plurality of sensing lines SL. According to some embodiments, the pixel PX may be connected the sensing lines SL. The gate lines may extend in a first direction D1. The data line DL may extend in a second direction D2 crossing the first direction D1. According to some embodiments, the sensing lines SL may extend in the first direction D1.

The driving controller 200 may receive input image data IMG, an input control signal CONT and a blank signal VBLS from a host processor and/or a graphic process unit. For example, the input image data IMG may include red image data, green image data and blue image data. For example, the input image data IMG may include white image data. For example, the input image data IMG may include magenta image data, yellow image data and cyan image data. The input control signal CONT may include a master clock signal and a data enable signal. The input control signal CONT may further include a vertical synchronizing signal and a horizontal synchronizing signal. The blank signal VBLS may include an information of a length of the blank period corresponding to a driving frequency of the display panel 100. According to some embodiments, the input control signal CONT may include the blank signal VBLS.

The driving controller 200 may generate a first control signal CONT1, a second control signal CONT2, a third control signal CONT3, a fourth control signal CONT4, a fifth control signal CONT5 and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

According to some embodiments, the gate driver 300 may receive a high voltage, a first low voltage VSSC and a second low voltage VSSS from the voltage generator 600. The high voltage may include a first high voltage and a second high voltage. The first low voltage VSSC and the second low voltage VSSS may be lower than the high voltage.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG and the input control signal CONT. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the voltage generator 600 based on the input control signal CONT, and output the fourth control signal CONT4 to the voltage generator 600. According to some embodiments, the fourth control signal CONT4 may be generated based on the input control signal CONT and the blank signal VBLS.

According to some embodiments, the driving controller 200 may generate the fifth control signal CONT5 for controlling an operation of the sensing driver 700 based on the input control signal CONT, and output the fifth control signal CONT5 to the sensing driver 700.

The gate driver 300 may generate gate signals for driving the gate lines in response to the first control signal CONT1 received from the driving controller 200. According to some embodiments, the gate signals may include a first gate signal SC and a second gate signal SS. For example, the first gate signal SC may be referred to as a scan gate signal. For example, the second gate signal SS may be referred to as a sensing gate signal SS. The gate driver 300 may output the gate signals to the gate lines. According to some embodiments, the gate lines may include first gate lines SCL and second gate lines SSL. According to some embodiments, the first gate signal SC may be applied to the first gate lines SCL. According to some embodiments, the second gate signal SS may be applied to the second gate lines SSL. For example, the gate driver 300 may sequentially output the first gate signals SC to the gate lines. For example, the gate driver 300 may sequentially output the second gate signals SS to the gate lines.

According to some embodiments of the present disclosure, the gate driver 300 may be integrated on the peripheral region of the display panel 100. According to some embodiments of the present disclosure, the gate driver 300 may be mounted on the peripheral region of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF has a value corresponding to each of the data signal DATA.

For example, the gamma reference voltage generator 400 may be located in the driving controller 200 or in the data driver 500.

The data driver 500 may receive the second control signal CONT2 and the data signal DATA from the driving controller 200 and receive the gamma reference voltages VGREF from the gamma reference voltage generator 400. The data driver 500 may convert the data signal DATA into a data voltage having an analog type using the gamma reference voltages VGREF. The data driver 500 may output the data voltage to the data lines DL. According to some embodiments, the data voltage VDATA may include the active data voltage AVDATA of FIG. 2 and the blank data voltage BVDATA of FIG. 2.

According to some embodiments of the present disclosure, the data driver 500 may be integrated on the peripheral region of the display panel 100. According to some embodiments of the present disclosure, the data driver 500 may be mounted on the peripheral region of the display panel 100.

The voltage generator 600 may generate a power voltage based on the fourth control signal CONT4 applied from the driving controller 200. The power voltage may include the high voltage, the first low voltage VSSC, the second low voltage VSSS, a first power voltage ELVDD and a second power voltage ELVSS. According to some embodiments, the voltage generator 600 may apply the high voltage, the first low voltage VSSC and the second low voltage VSSS to the gate driver 300. The voltage generator 600 may apply the first power voltage ELVDD and the second power voltage ELVSS to the display panel 100. The second power voltage ELVSS may be lower than the first power voltage ELVDD.

According to some embodiments, the voltage generator 600 may change the first low voltage VSSC in response to the fourth control signal CONT4. The voltage generator 600 may change the first low voltage VSSC based on the length of the blank period. For example, when the length of the blank period is increased, the voltage generator 600 may increase the first low voltage VSSC.

According to some embodiments, the sensing driver 700 may receive the fifth control signal CONT5 from the driving controller 200. The sensing driver 700 may generate sensing data by sensing the pixels PX through the sensing lines SL. For example, the sensing driver 700 may sense a driving characteristic (e.g., a mobility and/or a threshold voltage) of the driving transistor by measuring a sensing current (or a sensing voltage) of the driving transistor of the pixels PX through the sensing line SL. For example, an operation sensing the driving characteristic (e.g., a mobility and/or a threshold voltage) of the driving transistor may be referred to as a sensing operation.

According to some embodiments, the sensing driver 700 may be implemented with a separate integrated circuit from an integrated circuit of the data driver 500. In other embodiments, the sensing driver 700 may be included in the data driver 500 or may be included in the driving controller 200.

Additionally, according to some embodiments, the display panel driver may not include the sensing driver 700. Embodiments according to the present disclosure are not limited to a type of driver included in the display panel driver.

FIG. 2 is a circuit diagram illustrating an example of a pixel PX included in a display apparatus of FIG. 1. Although FIG. 2 illustrates various components in a pixel circuit according to some embodiments, embodiments according to the present disclosure are not limited thereto, and according to some embodiments, the pixel circuit may include additional components or fewer components without departing from the spirit and scope of embodiments according to the present disclosure.

Referring to FIG. 1 and FIG. 2, the pixel PX may include a first transistor T1, a second transistor T2, a third transistor T3, a first capacitor C1 and a light emitting element EE. For example, the pixel PX may have a 3T1C structure.

The first transistor T1 may include a control electrode connected to a first node N1, a first electrode receiving the first power voltage ELVDD and a second electrode connected to a second node N2. The first transistor T1 may generate a driving current in response to a voltage of the first node N1. The first transistor T1 may generate the driving current based on the active data voltage AVDATA. The first transistor T1 may apply the driving current to the light emitting element EE. For example, the first transistor T1 may be referred to as the driving transistor.

The second transistor T2 may a control electrode receiving the first gate signal SC, a first electrode receiving the active data voltage AVDATA and a second electrode connected to the first node N1. According to some embodiments, the first electrode of the second transistor T2 may be connected to the data line DL. The second transistor T2 may apply the data voltage VDATA to the first node N1 in response to the first gate signal SC. The second transistor T2 may apply the data voltage VDATA to the control electrode of the first transistor T1 in response to the first gate signal SC. For example, the second transistor T2 may be referred to as a writing transistor.

According to some embodiments, in the active period, the data voltage VDATA may be the active data voltage AVDATA. Accordingly, in the active period, the active data voltage AVDATA may be applied to the first node N1.

The third transistor T3 may include a control electrode receiving the second gate signal SS, a first electrode connected to a third node N3 and a second electrode connected to the second node N2. According to some embodiments, the first electrode of the third transistor T3 may be connected to the sensing line SL. The third transistor T3 may apply an initialization voltage to the second node N2 in response to the second gate signal SS. For example, the third transistor T3 may be referred to as a sensing transistor. For example, the third transistor T3 may be referred to as an initialization transistor.

The first capacitor C1 may include a first electrode connected to the first node N1 and a second electrode connected to the second node N2. For example, the first capacitor C1 may be referred to as a storage capacitor.

The light emitting element EE may include a first electrode connected to the second node N2 and a second electrode receiving the second power voltage ELVSS. For example, the first electrode of the light emitting element EE may be an anode. For example, the second electrode of the light emitting element EE may be a cathode. The light emitting element may emit light based on the driving current. According to some embodiments, the light emitting element EE may include an organic light emitting diode (OLED), a nano light emitting diode (NED), a quantum dot (QD) light emitting diode, a micro light emitting diode, an inorganic light emitting diode, or any other suitable light emitting element.

According to some embodiments, the first transistor T1, the second transistor T2 and the third transistor T3 may be an N-type transistor. However, embodiments according to the present disclosure are not limited to a type of the first transistor T1, the second transistor T2, and the third transistor T3.

Figure 3:
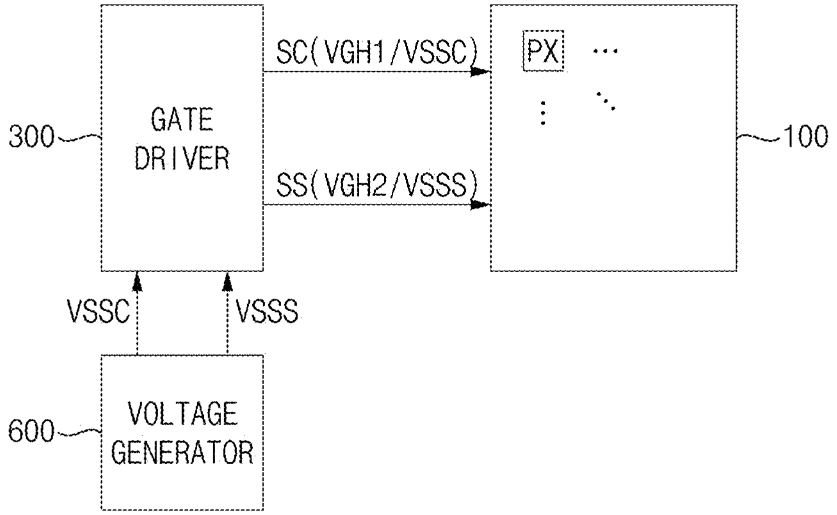
FIG. 3 is a block diagram illustrating a display panel, a gate driver and a voltage generator included in a display apparatus of FIG. 1.
Figure 4:
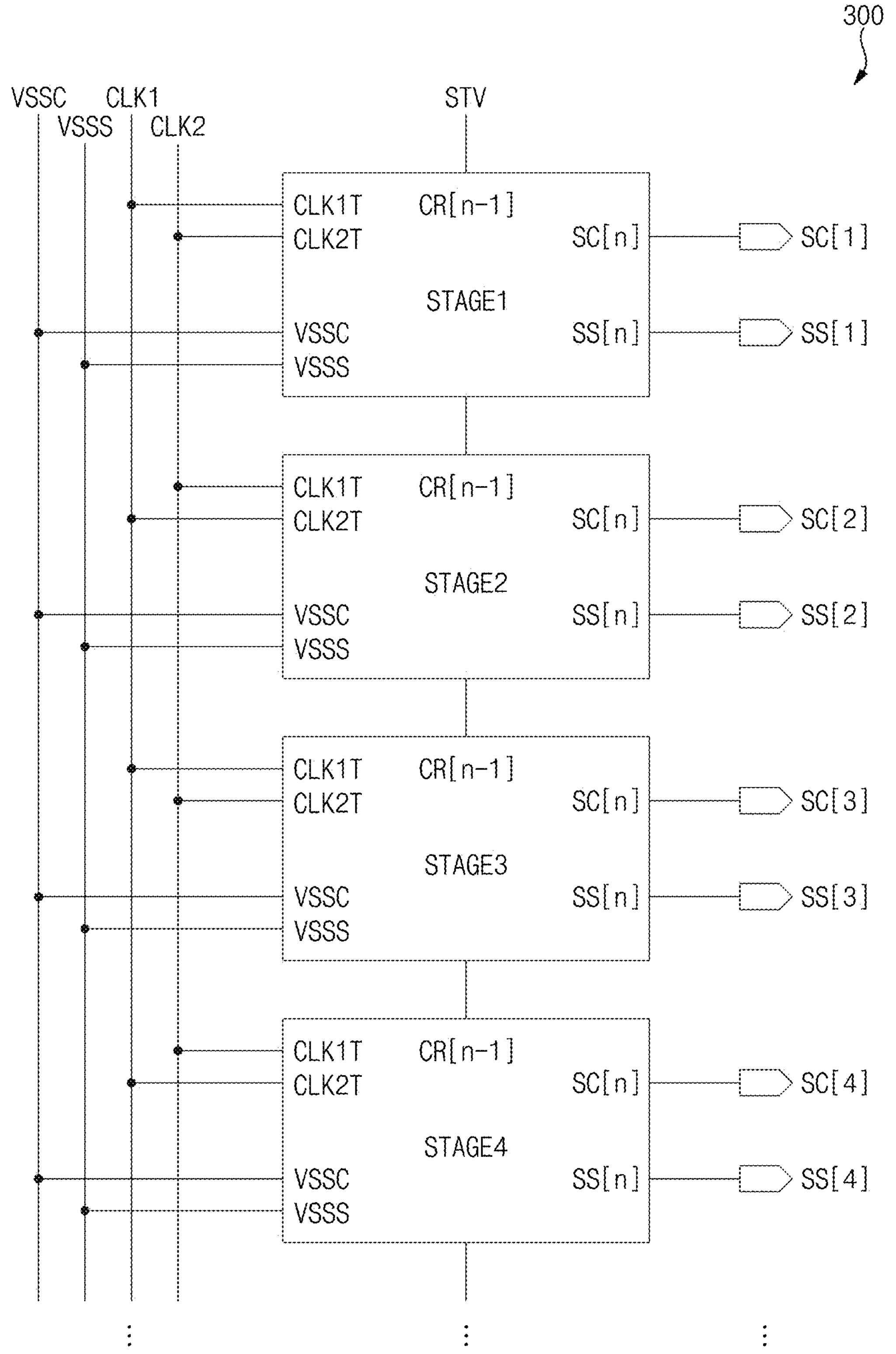
FIG. 4 is a block diagram illustrating a gate driver included in a display apparatus of FIG. 1.
Figure 5:
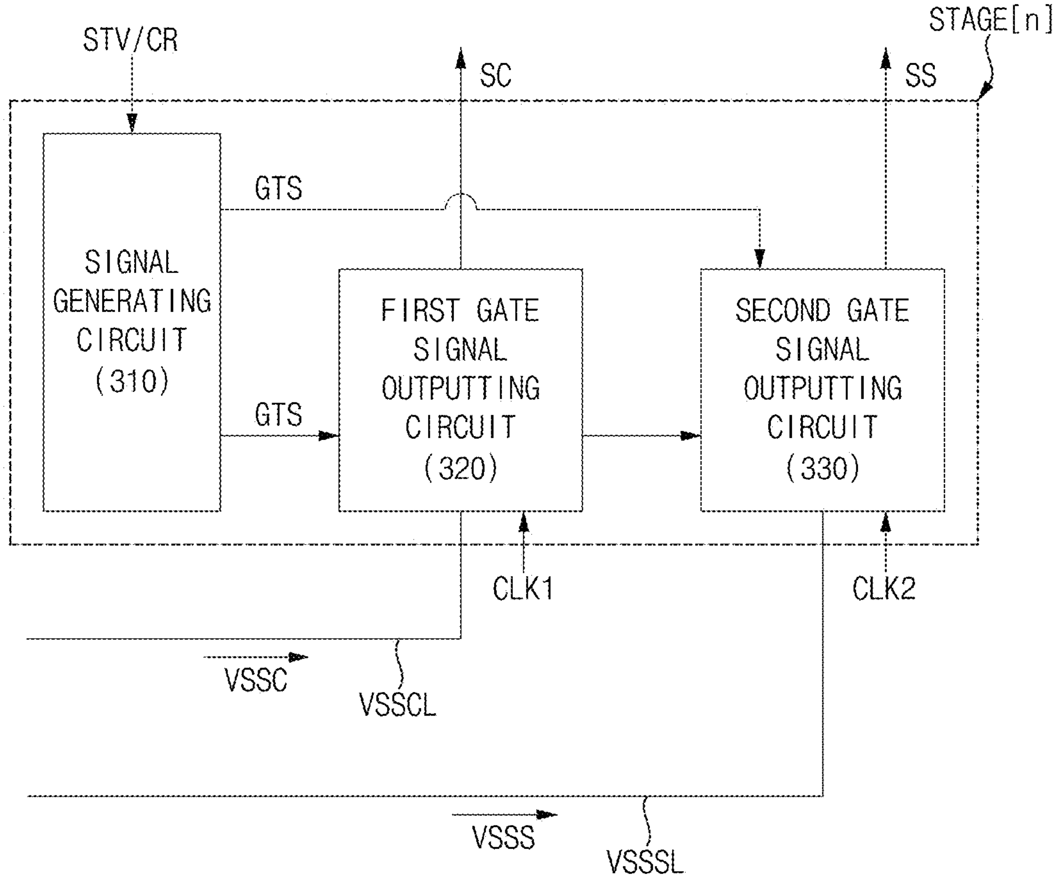
FIG. 5 is a block diagram illustrating an example of a stage of a gate driver of FIG. 4.

FIG. 3 is a block diagram illustrating a display panel 100, a gate driver 300 and a voltage generator 600 included in a display apparatus of FIG. 1. FIG. 4 is a block diagram illustrating a gate driver 300 included in a display apparatus of FIG. 1. FIG. 5 is a block diagram illustrating an example of a stage of a gate driver of FIG. 4.

Referring to FIG. 1 to FIG. 4, the gate driver 300 may generate the first gate signal SC by receiving the first low voltage VSSC. According to some embodiments, the first gate signal SC may transition between the first high voltage VGH1 and the first low voltage VSSC. The first high voltage may be a voltage such that the second transistor T2 is turned-on. The gate driver 300 may generate the second gate signal SS by receiving the second low voltage VSSS. According to some embodiments, the first gate signal SC may transition between the second high voltage VGH2 and the second low voltage VSSS. According to some embodiments, the gate driver 300 may apply the first gate signal SC and the second gate signal SS to the display panel 100.

The gate driver 300 may include a plurality of stages STAGE 1, STAGE 2, STAGE 3, STAGE 4, . . . receiving the vertical start signal STV, a first clock signal CLK1, a second clock signal CLK2, the first low voltage VSSC and the second low voltage VSS and sequentially outputting the first gage signals SC[1], SC[2], SC[3], SC[4], . . . and the second gate signals SS[1], SS[2], SS[3], SS[4], . . . to the pixels PX in row by row. According to some embodiments, a high level of the first clock signal CLK1 may be the first high voltage VGH1. According to some embodiments, a high level of the second clock signal CLK2 may be the second high voltage VGH2. According to some embodiments, the vertical start signal STV may be a previous stage carry signal CR[n−1].

The first clock signal CLK1 and the second clock signal CLK2 may be applied to a first clock terminal CLK1T and a second clock terminal CLK2T of a first stage STAGE1. The first clock signal CLK1 and the second clock signal CLK2 may be applied to the second clock terminal CLK2T and the first clock terminal CLK1T of a second stage STAGE2. Likewise, the first clock signal CLK1 and the second clock signal CLK2 may be applied to the first clock terminal CLK1T and the second clock terminal CLK2T of a third stage STAGE3. The first clock signal CLK1 and the second clock signal CLK2 may be applied to the second clock terminal CLK2T and the first clock terminal CLK1T of a fourth stage STAGE4.

One stage STAGE[n] of the stages STAGE1, STAGE2, STAGE3, STAGE4, . . . may include a signal generating circuit 310, a first gate outputting circuit 320 and a second gate outputting circuit 330.

The signal generating circuit 310 may receive at least one of the vertical start signal STV or a carry signal CR. The signal generating circuit 310 may generate a gate timing signal GTS based on at least one of the vertical start signal STV or the carry signal CR. The signal generating circuit 310 may apply the gate timing signal GTS to the first gate signal outputting circuit 320 and the second gate signal outputting circuit 330.

The first gate signal outputting circuit 320 may receive the first low voltage VSSC, the first clock signal CLK1 and the gate timing signal GTS. The first gate signal outputting circuit 320 may be connected to a first low voltage line VSSCL. The first gate signal outputting circuit 320 may generate the first gate signal SC based on the first low voltage VSSC, the first clock signal CLK1 and the gate timing signal GTS. According to some embodiments, the first gate signal outputting circuit 320 may generate the first gate signal SC based on the first low voltage VSSC, the first high voltage VGH1, the first clock signal CLK1 and the gate timing signal GTS. The first gate signal outputting circuit 320 may output the first gate signal SC.

The second gate signal outputting circuit 330 may receive the second low voltage VSSS, the second clock signal CLK2 and the gate timing signal GTS. The second gate signal outputting circuit 330 may be connected to a second low voltage line VSSSL. The second gate signal outputting circuit 330 may generate the second gate signal SS based on the second low voltage VSSS, the second clock signal CLK2 and the gate timing signal GTS. According to some embodiments, the second gate signal outputting circuit 330 may generate the second gate signal SS based on the second low voltage VSSS, the second high voltage VGH2, the second clock signal CLK2 and the gate timing signal GTS. The second gate signal outputting circuit 330 may output the second gate signal SS. The first low voltage VSSC and the second low voltage VSSS may be different.

Figure 6:
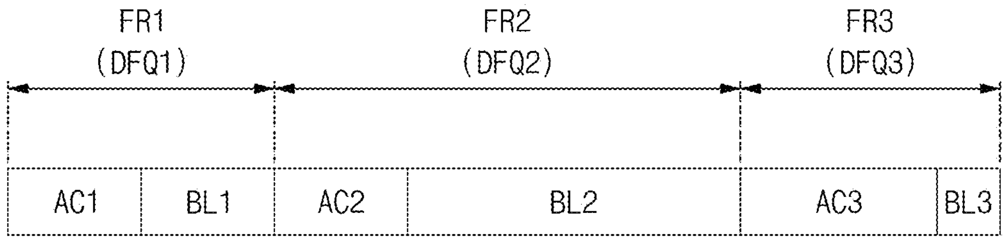
FIG. 6 is a diagram illustrating a driving frequency of a display panel of FIG. 1.
Figure 7:
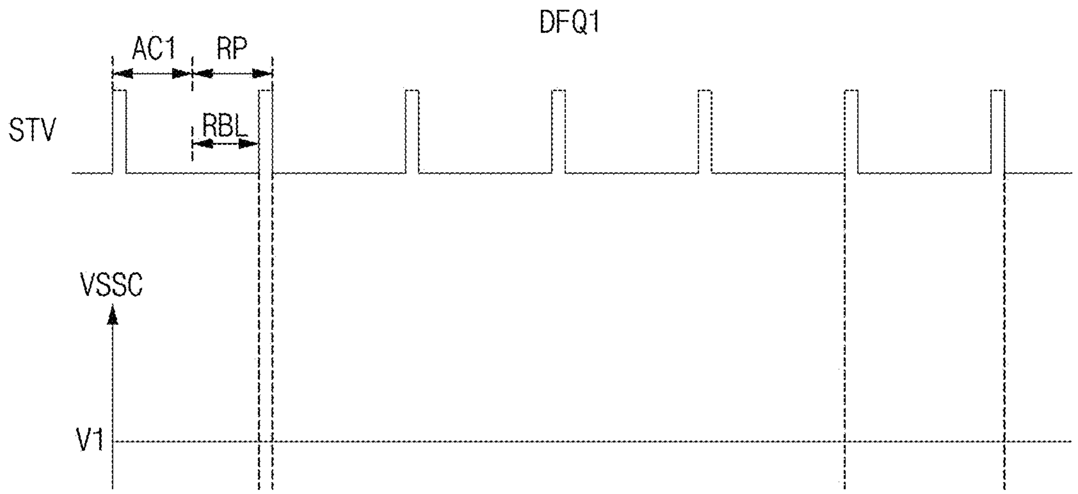
FIG. 7 is a graph illustrating a first low voltage in a first driving frequency of FIG. 6.
Figure 8:
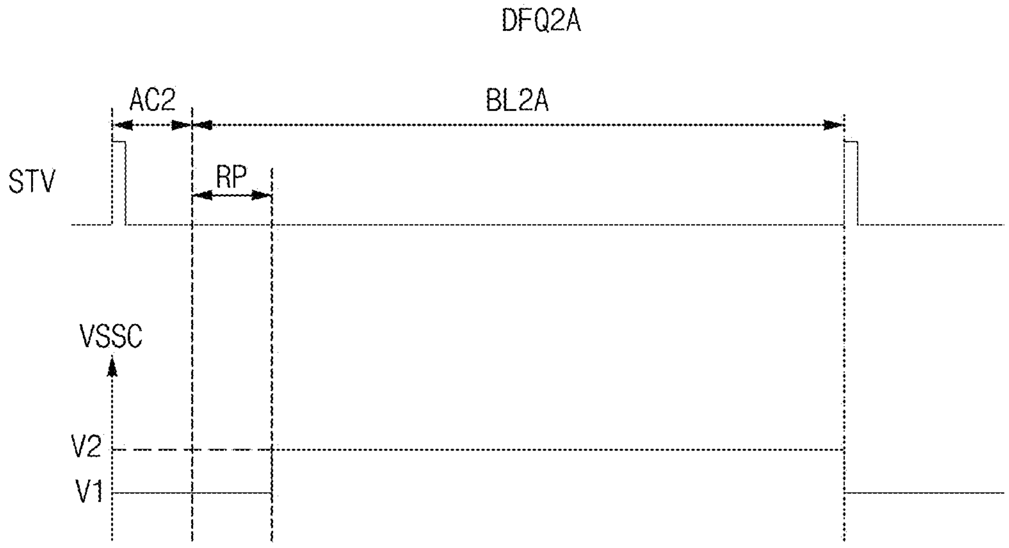
FIG. 8 is a graph illustrating a first low voltage in a second driving frequency of FIG. 6.
Figure 9:
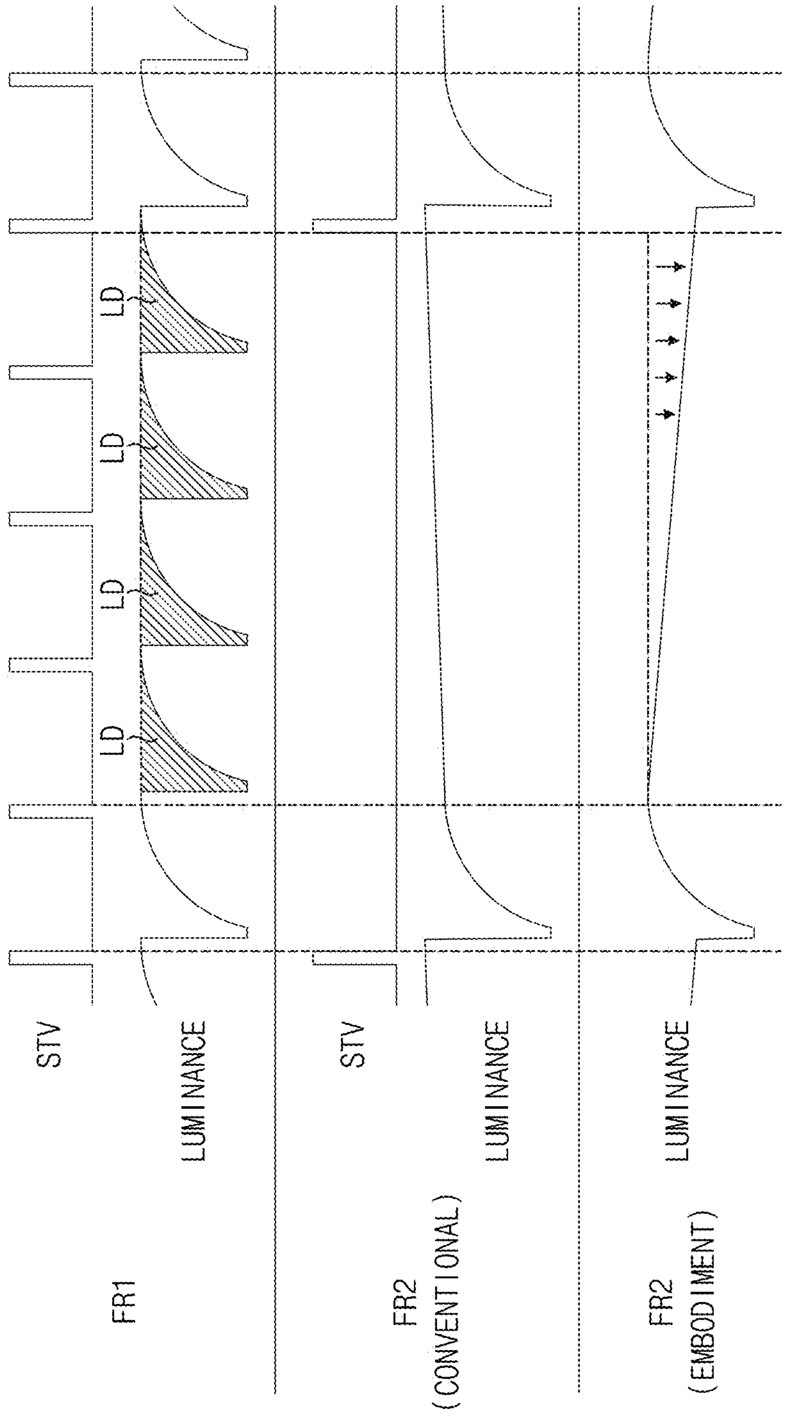
FIG. 9 is a graph illustrating a luminance of a conventional display apparatus and a luminance of a display apparatus according to some embodiments of the present disclosure.

FIG. 6 is a diagram illustrating a driving frequency of a display panel 100 of FIG. 1. FIG. 7 is a graph illustrating a first low voltage VSSC in a first driving frequency DFQ1 of FIG. 6. FIG. 8 is a graph illustrating a first low voltage VSSC in a second driving frequency DFQ2 of FIG. 6. FIG. 9 is a graph illustrating a luminance of a conventional display apparatus and a luminance of a display apparatus according to some embodiments of the present disclosure.

Referring to FIG. 1, FIG. 2 and FIG. 6 to FIG. 9, the display panel 100 may be driven at variable frequencies. A first frame FR1 having a first driving frequency DFQ1 may include a first active period AC1 and a first blank period BL1. A second frame FR2 having a second driving frequency DFQ2 different from the first driving frequency DFQ1 may include a second active period AC2 and a second blank period BL2. A third frame FR3 having a third driving frequency DFQ3 different from the first driving frequency DFQ1 and the second driving frequency DFQ2 may include a third active period AC3 and a third blank period BL3.

The first active period AC1 and the second active period AC2 may have a same length and the first blank period BL1 and the second blank period BL2 may have a different length. A length of the first blank period BL1 may be shorter than a length of the second blank period BL2. Accordingly, the first driving frequency DFQ1 may be greater than the second driving frequency DFQ2.

The second active period AC2 and the third active period AC3 may have a same length and the second blank period BL2 and the third blank period BL3 may have a different length.

According to some embodiments, in the first active period AC1, the first low voltage VSSC may be a first voltage V1. According to some embodiments, in the second active period AC2, the first low voltage VSSC may be the first voltage V1. According to some embodiments, in the third active period AC3, the first low voltage VSSC may be the first voltage V1.

In the first driving frequency DFQ1, the first low voltage VSSC may be the first voltage V1. A frame period corresponding to the first driving frequency DFQ1 may include the first active period AC1 and a reference blank period RBL. In the first active period AC1, the active data voltage AVDATA may be applied to the pixel PX. For example, the first voltage V1 may be a voltage such that the second transistor T2 is turned off. For example, the first driving frequency DFQ1 may be a maximum driving frequency at which the display panel 100 is driven. For example, the first voltage V1 may be about −5V. However, embodiments according to the present disclosure are not limited to a voltage level of the first voltage V1.

In the second driving frequency DFQ2A, the first low voltage VSSC may be changed from the first voltage V1 to a second voltage V2. A frame period corresponding to the second driving frequency DFQ2A may include the second active period AC2 and the second blank period BL2A. A length of the second blank period BL2A may be longer than a length of the reference blank period RBL. For example, when the vertical start signal STV may not have an activation level immediately after the reference blank period RBL, the first low voltage VSSC may be increased. For example, after a reference period RP, the first low voltage VSSC may be increased. The reference period RP may include an activation period of the vertical start signal STV immediately after the reference blank period RBL and the reference blank period RBL.

According to some embodiments, the second voltage V2 may be higher than the first voltage V1. The second voltage V2 may be lower than the first high voltage VGH1. In a blank period of the second driving frequency DFQ2A, the first low voltage VSSC may be changed from the first voltage V1 to the second voltage V2. Accordingly, the first gate signal SC may transition between the first high voltage VGH1 and the second voltage V2. In a blank period BL2A of the second driving frequency DFQ2A, the first gate signal SC may have the second voltage V2. The second voltage V2 may be lower than an activation level of the second transistor T2. The second voltage V2 may be higher than an inactivation level of the second transistor T2. Accordingly, the second transistor T2 may be turned on. For example, when the second transistor T2 is turned on, the second transistor T2 may be driven in a saturation region. For example, the blank period BL2A of the second driving frequency DFQ2A, the second transistor T2 may be weakly turned on. For example, when the second transistor T2 is weakly turned on, the second transistor T2 may be driven in a linear region. Accordingly, the blank period BL2A of the second driving frequency DFQ2A, the second transistor T2 may generate a blank current. In the blank period BL2A of the second driving frequency DFQ2A, the second transistor T2 may apply the blank current to the data line DL. Accordingly, the blank period BL2A of the second driving frequency DFQ2A, a luminance of the display panel 100 may be reduced.

According to some embodiments, when the second transistor T2 is a P-type transistor, the second voltage V2 may be lower than the first voltage V1.

According to some embodiments, in the blank period BL2, the data voltage VDATA may be the blank data voltage BVDATA. The display panel driver may control a drain-source voltage of the second transistor T2 in the blank period BL2. For example, in the blank period, the second transistor T2 may apply the blank current to the data line DL. Accordingly, in the blank period BL2, the blank current of the second transistor T2 may be controlled.

In a conventional display apparatus, when a driving frequency is decreased, a luminance difference LD in a blank period of the second driving frequency DFQ2A may occur compared with the first driving frequency. Accordingly, a display quality of the conventional display apparatus may be deteriorated.

Additionally, the conventional display apparatus may compensate the luminance difference LD by changing a data voltage based on a driving frequency of a present frame. Compensating based on a driving frequency of a present frame in a conventional display apparatus, so that a reverse compensation may occur in a first frame where a driving frequency changes. Accordingly, a luminance may be changed in the first frame where a driving frequency changes. Accordingly, a flashing may be visible in the conventional display apparatus. Additionally, a display quality of the conventional display apparatus may be deteriorated.

In contrast, the display apparatus according to some embodiments of the present disclosure, in the blank period of the second driving frequency DFQ2A, a luminance of the display panel 100 may be reduced. Accordingly, the luminance difference LD may be reduced. Accordingly, a display quality of the display apparatus may be improved.

Additionally, the active data voltage AVDATA of the display apparatus may not be changed for compensating the luminance difference LD, the reverse compensation may not occur. Accordingly, a display quality of the display apparatus may be improved.

Figures 10, 11:
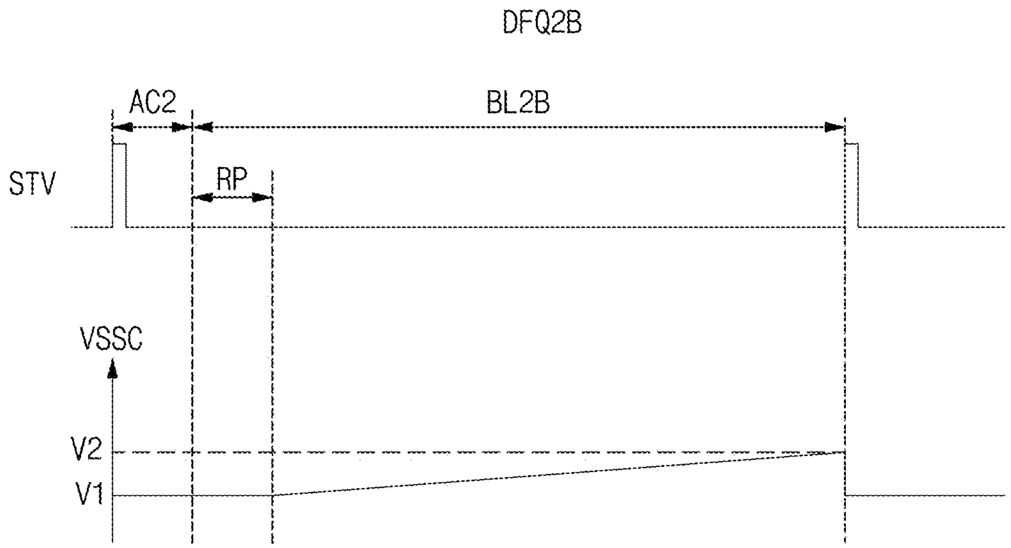
FIG. 10 is a table illustrating an example of a blank data voltage which a data driver of display apparatus of FIG. 1 outputs.
FIG. 11 is a graph illustrating an example of a first low voltage in a second driving frequency of FIG. 6.

FIG. 10 is a table illustrating an example of a blank data voltage BVDATA which a data driver 500 of display apparatus of FIG. 1 outputs.

Referring to FIG. 1 to FIG. 10, according to some embodiments, the display panel driver may include a blank data look-up table BDLUT storing voltage levels of the blank data voltage BVDATA corresponding a plurality of grayscales. The blank data voltage BVDATA may be determined by using the blank data look-up table BDLUT.

According to some embodiments, in the blank period BL2 of the second driving frequency DFQ2, the blank data voltage BVDATA may be applied to the data line DL. Accordingly, the blank current may be changed based on the blank data voltage BVDATA. The blank data voltage BVDATA may be generated by using the blank data look-up table BDLUT. The blank data voltage BVDATA may correspond to a grayscale of the input image data IMG. For example, the blank data voltage BVDATA may correspond to the frame-by-frame grayscale of the input image data IMG. For example, a first blank data voltage BVDATA1 corresponding to a first grayscale GR1 may be generated. For example, a second blank data voltage BVDATA2 corresponding to a second grayscale GR2 may be generated. For example, a third blank data voltage BVDATA3 corresponding to a third grayscale GR3 may be generated. For example, the first grayscale GR1 may be about 1 grayscale. For example, the first blank data voltage BVDATA1 may be about 4V. For example, the second grayscale GR2 may be about 128 grayscale. For example, the second blank data voltage BVDATA2 may be about 6V. For example, the third grayscale GR3 may be about 255 grayscale. For example, the third blank data voltage BVDATA3 may be about 9V. A blank data voltage corresponding to grayscales between the first grayscale GR1 to the third grayscale GR3 may be generated by using an interpolation on the first blank data voltage BVDATA1 to the third blank data voltage BVDATA3. However, embodiments according to the present disclosure are not limited to a value of a grayscale of the display panel 100 and the blank data voltage. For example, the third grayscale may be about 4096 grayscale.

According to some embodiments, the blank data look-up table BDLUT may be stored based on a characteristic of the display apparatus. For example, characteristic of the display apparatus may include information such as a size of the display panel 100.

According to some embodiments, in the blank period BL2 of the second driving frequency DFQ2, the blank current may be further finely controlled. Accordingly, a display quality of the display apparatus may be further improved.

FIG. 11 is a graph illustrating an example of a first low voltage VSSC in a second driving frequency DFQ2 of FIG. 6.

The first low voltage VSSC according to the present embodiments is the same (or substantially the same) as the driving of the embodiments described with reference to FIG. 1 to FIG. 10, except that the first low voltage VSSC is gradually increased from the first voltage V1 to the second voltage V2 in the blank period BL2B of the second driving frequency DFQ2B. Accordingly, the same reference numerals will be used to refer to the same and some repetitive explanation concerning the above elements may be omitted.

Referring to FIG. 1 to FIG. 7 and FIG. 9 to FIG. 11, according to some embodiments, the first low voltage VSSC may be gradually increased from the first voltage V1 to the second voltage V2 in the blank period BL2B of the second driving frequency DFQ2B.

Accordingly, in the blank period of the second driving frequency DFQ2B, a luminance of the display panel 100 may be reduced. Accordingly, the luminance difference LD may be reduced. Accordingly, a display quality of the display apparatus may be improved.

Additionally, the active data voltage AVDATA of the display apparatus may not be changed for compensating the luminance difference LD, the reverse compensation may not occur. Accordingly, a display quality of the display apparatus may be improved.

Figure 12:
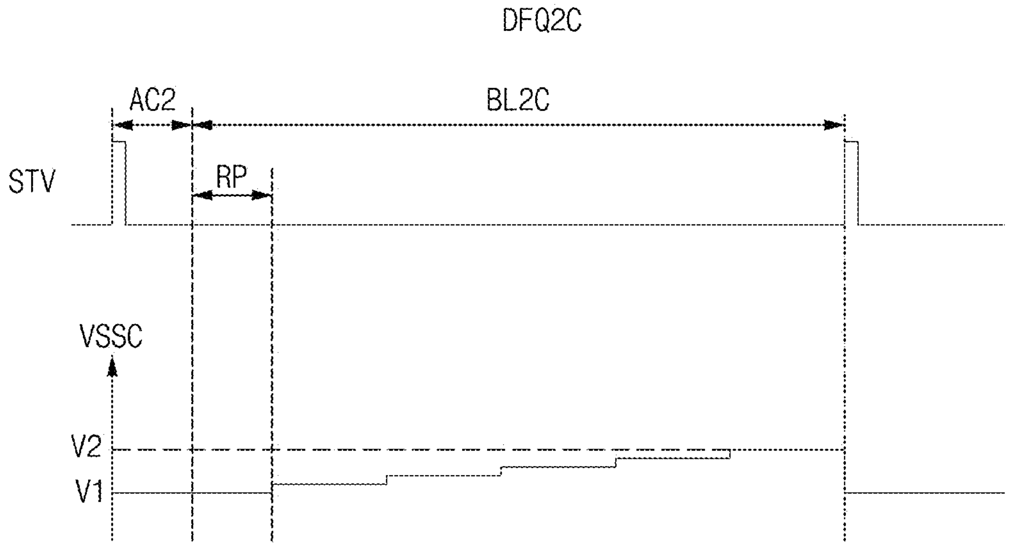
FIG. 12 is a graph illustrating an example of a first low voltage in a second driving frequency of FIG. 6.

FIG. 12 is a graph illustrating an example of a first low voltage VSSC in a second driving frequency DFQ2 of FIG. 6.

The first low voltage VSSC according to the present embodiments is the same (or substantially the same) as the driving of the embodiments described with reference to FIG. 1 to FIG. 10, except that the first low voltage VSSC is increased stepwise from the first voltage V1 to the second voltage V2 in the blank period BL2C of the second driving frequency DFQ2C. Accordingly, the same reference numerals will be used to refer to the same and some repetitive explanation concerning the above elements may be omitted.

Referring to FIG. 1 to FIG. 7, FIG. 9 to FIG. 10 and FIG. 12, according to some embodiments, the first low voltage VSSC may be increased stepwise from the first voltage V1 to the second voltage V2 in the blank period BL2C of the second driving frequency DFQ2C.

Accordingly, in the blank period of the second driving frequency DFQ2C, a luminance of the display panel 100 may be reduced. Accordingly, the luminance difference LD may be reduced. Accordingly, a display quality of the display apparatus may be improved.

Additionally, the active data voltage AVDATA of the display apparatus may not be changed for compensating the luminance difference LD, the reverse compensation may not occur. Accordingly, a display quality of the display apparatus may be improved.

Figure 13:
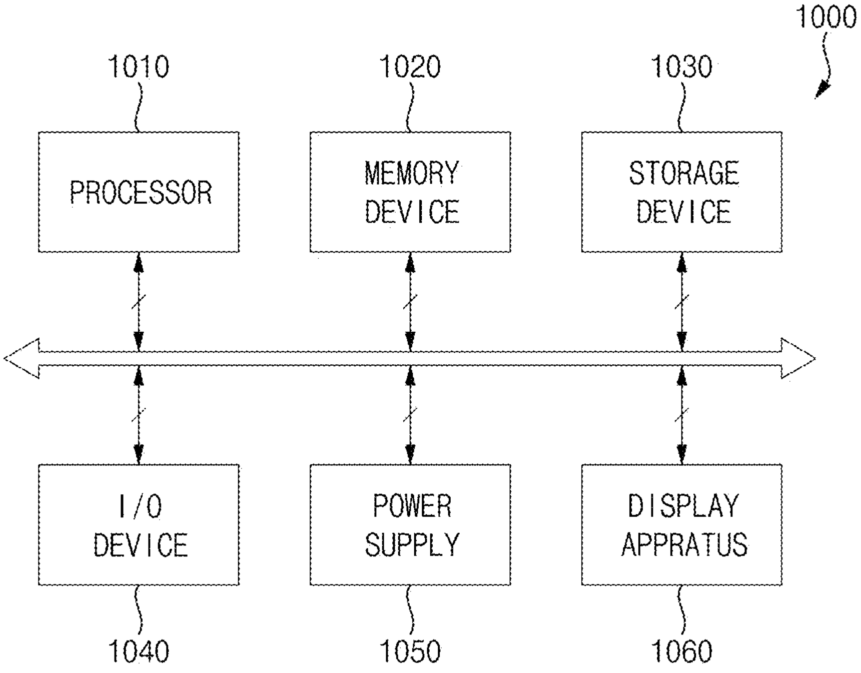
FIG. 13 is a block diagram illustrating an electronic device according to some embodiments of the present disclosure.
Figure 14:
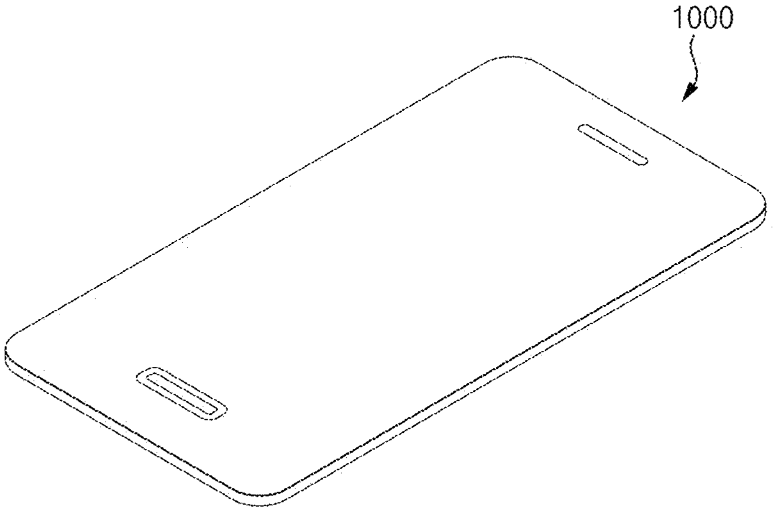
FIG. 14 is a diagram illustrating an example in which the electronic device of FIG. 13 is implemented as a smart phone.

FIG. 13 is a block diagram illustrating an electronic device 1000 according to some embodiments of the present disclosure. FIG. 14 is a diagram illustrating an example in which the electronic device of FIG. 13 is implemented as a smart phone.

Referring to FIG. 13, the electronic device 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1. In addition, the electronic device 1000 may further include a plurality of ports for communicating with a video card, a sound card, a memory card, a universal serial bus (USB) device, other electronic device, etc.

According to some embodiments, as illustrated in FIG. 14, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG, the app-on signal APPON and the input control signal CONT to the driving controller 200 of FIG. 1.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic device 1000. The display apparatus 1060 may be coupled to other components via the buses or other communication links.

Referring to FIG. 14, the electronic device of the present disclosure is shown implemented as a smartphone, but embodiments according to the present disclosure are not limited thereto. The electronic device may be a television, a monitor, a laptop computer, or a tablet. Additionally, the electronic device may be a car.

The display apparatus according to the embodiments may be applied to a display apparatus included in a computer, a notebook, a mobile phone, a smart phone, a smart pad, a PMP, a PDA, an MP3 player, or the like.

The foregoing is illustrative of aspects of some embodiments of the present disclosure and is not to be construed as limiting thereof. Although aspects of some embodiments of the present disclosure have been described, those skilled in the art will readily appreciate that many modifications are possible in the embodiments without materially departing from the novel teachings and characteristics of embodiments according to the present disclosure. Accordingly, all such modifications are intended to be included within the scope of embodiments according to the present disclosure as defined in the claims. In the claims, means-plus-function clauses are intended to cover the structures described herein as performing the recited function and not only structural equivalents but also equivalent structures. Therefore, it is to be understood that the foregoing is illustrative of aspects of some embodiments according to the present disclosure and is not to be construed as limited to the specific embodiments disclosed, and that modifications to the disclosed embodiments, as well as other embodiments, are intended to be included within the scope of the appended claims, and their equivalents. Aspects of some embodiments according to the present disclosure are defined by the following claims, with equivalents of the claims to be included therein.

What is claimed is:

1. A display apparatus comprising:

a display panel including a pixel; and a display panel driver configured to provide an active data voltage to the pixel through a data line in an active period, and to apply a blank data voltage to the data line in a blank period, wherein the pixel includes:

a light emitting element;

a first transistor configured to apply a driving current to the light emitting element;

a second transistor configured to apply the active data voltage to the first transistor in response to a first gate signal; and a third transistor configured to apply an initialization voltage to the light emitting element in response to a second gate signal, wherein the first gate signal transitions between a first high voltage and a first low voltage and the second gate signal transitions between a second high voltage and a second low voltage, and wherein the first low voltage is changed based on a change in a driving frequency of the display panel, wherein based on the driving frequency being changed from a first driving frequency to a second driving frequency lower than the first driving frequency, the first low voltage is increased from a first voltage to a second voltage throughout the blank period of a frame period corresponding to the second driving frequency.

2. The display apparatus of claim 1, wherein the first low voltage is higher than the second low voltage during the second driving frequency.

3. The display apparatus of claim 1, wherein in the blank period of the frame period corresponding to the second driving frequency, a blank current flows through the second transistor.

4. The display apparatus of claim 1, wherein in the blank period of the frame period corresponding to the second driving frequency, the first low voltage is increased from the first voltage to the second voltage.

5. The display apparatus of claim 1, wherein in the blank period of the frame period corresponding to the second driving frequency, the first low voltage is gradually increased from the first voltage to the second voltage.

6. The display apparatus of claim 1, wherein in the blank period of the frame period corresponding to the second driving frequency, the first low voltage is increased stepwise from the first voltage to the second voltage.

7. The display apparatus of claim 1, wherein the display panel driver is configured to control a drain-source voltage of the second transistor in the blank period.

8. The display apparatus of claim 7, wherein the display panel driver includes a blank data look-up table configured to store voltage levels of the blank data voltage corresponding to a plurality of grayscales, and wherein the blank data voltage is determined based on the blank data look-up table.

9. The display apparatus of claim 1, wherein in the active period, the first low voltage is the first voltage.

10. The display apparatus of claim 1, wherein the display panel driver includes:

a voltage generator configured to generate the first low voltage and the second low voltage;

a gate driver configured to generate the first gate signal based on the first low voltage and the first high voltage, and to generate the second gate signal based on the second low voltage and the second high voltage;

a data driver configured to apply the active data voltage and the blank data voltage; and a driving controller configured to control the data driver, the gate driver, and the voltage generator, and wherein the voltage generator is configured to change the first low voltage based on the driving frequency.

11. The display apparatus of claim 10, wherein based on the driving frequency being changed from a first driving frequency to a second driving frequency lower than the first driving frequency, the voltage generator is configured to increase the first low voltage.

12. The display apparatus of claim 11, wherein in the blank period of a frame period corresponding to the second driving frequency, the voltage generator is configured to change the first low voltage from a first voltage to a second voltage.

13. The display apparatus of claim 10, wherein the gate driver includes a plurality of stages, wherein at least one of the stages includes a first gate signal outputting circuit configured to output the first gate signal and a second gate signal outputting circuit configured to output the second gate signal, and wherein the first gate signal outputting circuit is connected to a first low voltage line configured to receive the first low voltage, and the second gate signal outputting circuit is connected to a second low voltage line configured to receive the second low voltage.

14. The display apparatus of claim 1, wherein a length of the blank period is changed based on the driving frequency.

15. The display apparatus of claim 14, wherein based on the driving frequency being changed from a first driving frequency to a second driving frequency lower than the first driving frequency, the length of the blank period is increased.

16. The display apparatus of claim 15, wherein based on the length of the blank period being increased, the first low voltage is increased.

17. The display apparatus of claim 1, wherein the first transistor includes a control electrode connected to a first node, a first electrode configured to receive a first power voltage and a second electrode connected to a second node, wherein the second transistor includes a control electrode configured to receive the first gate signal, a first electrode connected to the data line and a second electrode connected to the first node, and wherein the third transistor includes a control electrode configured to receive the second gate signal, a first electrode receiving the initialization voltage and a second electrode connected to the second node.

18. A display apparatus comprising:

a display panel including a pixel;

a gate driver configured to apply a first gate signal and a second gate signal to the display panel; and a data driver configured to apply an active data voltage to the display panel, wherein the first gate signal transitions between a first high voltage and a first low voltage and the second gate signal transitions between a second high voltage and a second low voltage, and wherein based on a driving frequency being changed from a first driving frequency to a second driving frequency lower than the first driving frequency, the first low voltage is increased from a first voltage to a second voltage throughout a blank period of a frame period corresponding to the second driving frequency.

19. The display apparatus of claim 18, wherein based on the driving frequency of the display panel being changed from the first driving frequency to the second driving frequency lower than the first driving frequency, the first low voltage during the second driving frequency is higher than the first low voltage during the first driving frequency.

* * * * *